Figure 1:
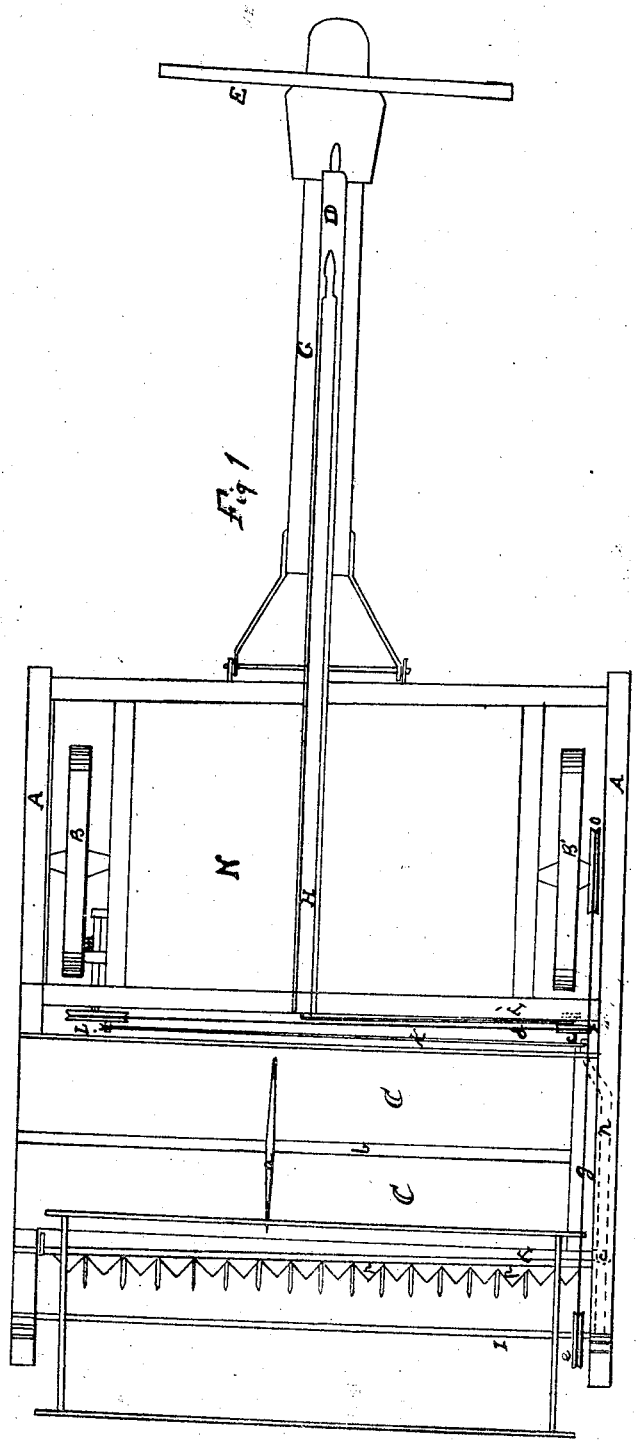

Sheet 1 — 2 Sheets.

T. Windell.
Mower.

N° 20525      Patented Jun. 8, 1858

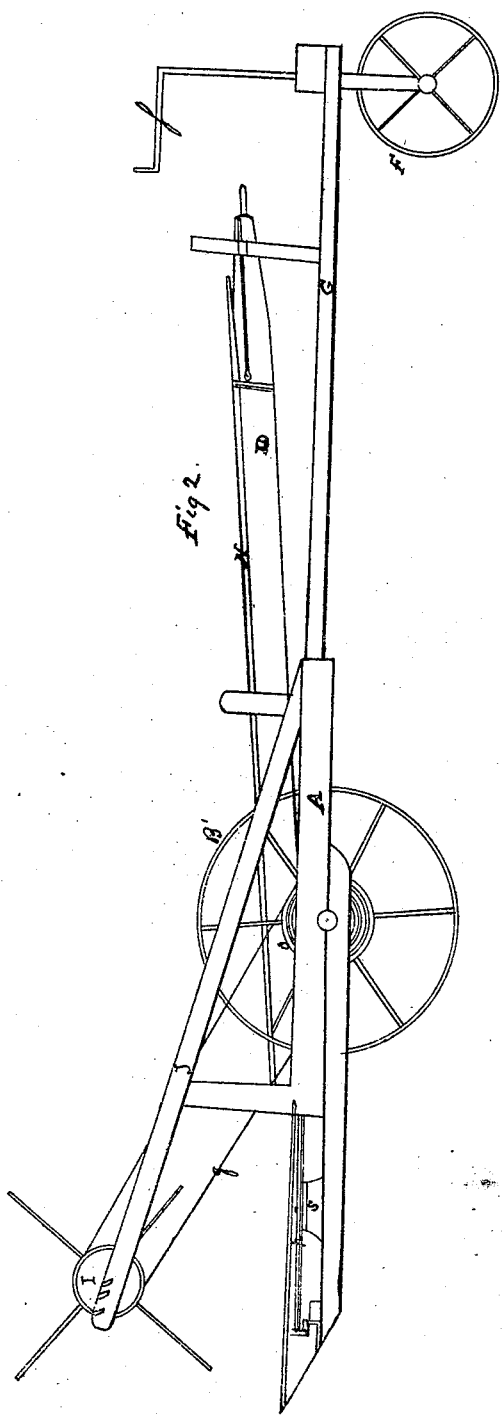

UNITED STATES PATENT OFFICE.

THOS. WINDELL, OF NEW ALBANY, INDIANA.

IMPROVEMENT IN HARVESTERS.

Specification forming part of Letters Patent No. 20,525, dated June 8, 1858.

*To all whom it may concern:*

Be it known that I, THOMAS WINDELL, of the city of New Albany, county of Floyd, and State of Indiana, have invented certain new and useful Improvements in Reaping-Machines; and I do hereby declare that the following is a full, clear, and exact description of the same, reference being had to the accompanying drawings, and to the letters of reference marked thereon.

The nature of this invention consists in the arrangement of the revolving rake and the several parts which operate the belt which drives and the belt to which said rake is attached.

In order that those skilled in the arts may make and use this invention, I will proceed to describe its construction and operation.

In the annexed drawings, Figure 1 represents a plan view; Fig. 2, a side elevation.

In the several figures, A represents the frame of the machine. G is the tongue, E being the whiffletree, secured to it, to which power is attached.

The body of the machine is balanced on the two wheels B and B'; and D is a lever secured to said body and extending back along the tongue for the purpose of regulating the height of cut.

H is a lever for regulating the shaft $c$, as will be described.

B is the driving-wheel of the machine.

B' is a wheel which drives the reel I.

$m$ is a small pinion, which works in a cog-wheel within the driving-wheel B.

L is a pulley on the same shaft with that on which the pinion $m$ is secured. This pulley is provided with a crank, $i$, to which is attached the connecting-rod $k$. A belt, $d$, also passes over this pulley and connects it with pulley $x$.

$c$ is a shaft, one end of which has its bearing in the cross-piece T, the other end being secured in a sliding journal-box, which works in the cross-piece T'. Pulley $x$ is secured to this shaft $c$, and the belt $b$ passes around it and is operated by means of it.

It will be seen that the end of lever H turns toward the shaft $c$, and may be made to press against it, operating it so as to tighten or loosen the belts $d$ and $b$ at pleasure.

The connecting-rod $k$ is secured at one end to the crank on pulley L and at the other to a lever, $r$, which lever serves to operate the cutter-bar $p$.

I is the reel for the purpose of drawing in the heads of the grain toward the machine. The shaft of said reel is provided with a pulley, $e$, said pulley $e$ being connected to pulley O on shaft of wheel B by means of belt $g$.

J are inclined bars, secured to the frame, for the purpose of sustaining the reel.

C is a stationary platform, on which the grain falls after being cut. $b$ is an endless belt operated around this platform, said belt being provided with a rake or rakes, $a$, for the purpose of carrying off the grain from the platform. This platform is in two parts, and the belt $b$ runs between these parts and below the platform, so that when the grain falls it is not moved or carried along by the belt until a bundle is formed and the rake comes around and carries it off. All the grain that falls upon the platform thus lies unmoved except by the rake, which conveys it off in bundles to the side of the machine. I may find it best to secure more rakes than one to the belt $b$, when operating in heavy grain.

By means of the lever H and the movable shaft $c$ the rake may be stopped at any instant, and in case any part should be inoperative, a man, by standing on the platform N, may rake the grain off in bundles, by means of a common pitchfork, and thus prevent vexatious delays.

I am aware that there are levers for stopping the several parts of machines when in operation, and I am also aware that endless belts have been used for conveying away the grain; but I am not aware that the peculiar arrangement here employed has ever before been known or used for stopping the rakes of a machine; nor am I aware that an endless belt provided with rakes and operated around and below a stationary platform has ever been used in the manner herein specified.

Having thus fully described my invention, what I claim as new, and desire to secure by Letters Patent, is—

The arrangement of the rake $a$ on the endless belt $b$, operated around and below the stationary platform C, in the manner herein set forth, in combination with the shaft $c$, belt $d$, and lever H, when these several parts are constructed, arranged, and operated in the manner and for the purpose set forth.

THOMAS WINDELL.

Witnesses:
JARED C. JOCELYN,
JOHN D. DANIEL.